United States Patent [19]

Macchiarulo

[11] Patent Number: 5,243,532
[45] Date of Patent: Sep. 7, 1993

[54] PROCESS FOR THE CONTROL OF THE QUALITY AND OF THE PRODUCTION OF TRANSMISSION BELTS

[75] Inventor: Vincenzo Macchiarulo, Pescara, Italy

[73] Assignee: Pirelli Trasmissioni Industriali S.p.A., Chieti, Italy

[21] Appl. No.: 792,880

[22] Filed: Nov. 21, 1991

[30] Foreign Application Priority Data

Nov. 21, 1990 [IT] Italy .................. 22127 A/90

[51] Int. Cl.⁵ .................. G06F 15/46; B29D 29/08
[52] U.S. Cl. .................. 364/473; 156/137; 264/40.5; 264/40.6; 264/320; 364/552; 425/34.2; 425/818
[58] Field of Search .............. 364/473, 476, 500, 503, 364/552, 557, 558; 156/137, 138, 140, 141; 425/28.1, 29, 34.2, 818, 135, 143; 264/40.1, 40.5, 40.6, 320

[56] References Cited

U.S. PATENT DOCUMENTS

| | | | |
|---|---|---|---|
| 3,374,297 | 3/1968 | Henderson | 264/40.1 |
| 3,659,974 | 5/1972 | Neugroschl | 425/29 |
| 4,105,488 | 8/1978 | Hayes et al. | |
| 4,549,503 | 3/1987 | Keller | 364/552 |
| 4,831,741 | 5/1989 | Sogoian | 364/552 |

FOREIGN PATENT DOCUMENTS

| | | |
|---|---|---|
| 0199546 | 10/1985 | European Pat. Off. |
| 0212033 | 3/1987 | European Pat. Off. |
| 60-239231 | 11/1985 | Japan |

Primary Examiner—Jeffery Thurlow
Assistant Examiner—Mathieu Vargot
Attorney, Agent, or Firm—Stevens, Davis, Miller & Mosher

[57] ABSTRACT

Installation for the automated manufacture of transmission belts, having equipment for the preparation of a multi-belt sleeve including at least one coiling machine (SP) on toothed drum, a calendering machine (CL1) for the application of a rubber composition, a molding and curing station (V1) and a final station (FN) having at least one checking machine (CQ) connected to a central control unit (UCC). The checking process is based on the use of a narrow range of tolerance wherein the values of the magnitude under control are acceptable, and of a wider range of tolerance external to the previous one, wherein the values of the magnitude are acceptable in a conditional manner, for example, in relation to the time of permanence within such range, and in any case after a final verification of the product affected by the anomaly.

7 Claims, 3 Drawing Sheets

PROCESS FOR THE CONTROL OF THE QUALITY AND OF THE PRODUCTION OF TRANSMISSION BELTS

CROSS REFERENCE TO RELATED APPLICATION

Copending U.S. applications Ser. No. 792,876, filed on even date herewith and corresponding to:

Italian Application 22 121 A/90, filed Nov. 21, 1990 for PROCESS AND APPARATUS TO APPLY IDENTIFICATION INSCRIPTIONS ON SLEEVES MADE OF ELASTOMERIC MATERIAL IN THE MANUFACTURE OF DRIVING BELTS (WAK 28335, case 9015).

Copending U.S. applications Ser. No. 793,731, filed on even date herewith and corresponding to:

Italian Application 22 123 A/90, filed Nov. 21, 1990 for PROCESS AND APPARATUS FOR HANDLING DRIVING BELTS IN AN AUTOMATED MANNER (WAK 28349, case 9017).

Copending U.S. applications Ser. No. 793,840, filed on even date herewith and corresponding to:

Italian Application 22 124 A/90, filed Nov. 21, 1990 for MACHINE AND PROCESS FOR COILING AND WINDING TUBULAR SLEEVES OF ELASTOMERIC MATERIAL INCORPORATING REINFORCING FIBERS (WAK 28350, case 9018).

Copending U.S. application Ser. No. 793,732, filed on even date herewith and corresponding to:

Italian Application 22 125 A/90, filed Nov. 21, 1990 for PROCESS AND APPARATUS FOR THE INSPECTING JUNCTIONS IN SLEEVE LINING FABRICS FOR THE MANUFACTURE OF TOOTHED BELTS (WAK 28717 case 9020).

Copending U.S. application Ser. No. 793,733, filed on even date herewith and corresponding to:

Italian Application 22 126 A/90, filed Nov. 21, 1990 for PROCESS AND APPARATUS TO IDENTIFY THE PRESENCE OF STRUCTURAL CAVITIES IN SLEEVES FOR THE MANUFACTURE OF DRIVING BELTS (WAK 28710, case 9021).

Copending U.S. application Ser. No. 793,729, filed on even date herewith and corresponding to:

Italian Application 22 128 A/90, filed Nov. 21, 1990 for A PROCESS AND APPARATUS FOR INSPECTING THE GEOMETRICAL CONFIGURATION OF TOOTHED DRIVING ELEMENTS (WAK 28351, case 9019).

The disclosure of each of the above identified U.S. and Italian Applications are hereby incorporated by reference.

BACKGROUND OF THE INVENTION

The present invention relates to a process for the control of the quality and of the production of continuous transmission belts and to an automatic installation for the manufacture of such belts.

As is known, transmission belts are elements used to transmit a torque between two devices, such as on earth-moving machines, vehicles, etc.

The belts are of different types and construction, and the transmission can occur by friction in asynchronous belts, or by the engagement of teeth (gearing) in toothed belts. The latter have a plurality of teeth and a plurality of hollow spaces for the engagement with associated toothed pulleys.

The invention will be illustrated with particular reference to the manufacture of toothed belts, but it is not to be considered limited to the use for the production only of this type of belts.

A toothed belt comprises longitudinal inextensible cords buried in a mass of elastomer which has teeth and hollow spaces on one face and is smooth on the other face, known as the back of the belt.

The cords, say of glass fibers, textile or metal threads, etc., are arranged along the neutral axis of the belt and bear the working load, ensuring a constant distance between the axes since the teeth are made of deformable material.

The current manufacturing processes provides for the use of a very long toothed metal drum on which there is initially mounted a sheath of tubular material, corresponding to the drum's internal diameter, used to enhance the resistance of the tooth.

On the drum there is then wound a helical winding of an inextensible thread which will constitute the cords, by means of a machine called a coiling machine, after which successive layers or sheets of uncured rubber or more in general of non-cured elastomeric material.

The semi-finished articles thus obtained, defined as sleeves, are subjected to curing and molding in an autoclave, inside a rubber sleeve or chamber which transmits a molding pressure, while curing heat is provided by steam or water introduced inside the drum.

The rubber or the elastomer filters through the threads of the cords and fills the hollow spaces of the teeth, while the material is pushed inside the teeth on the drum by the pressure of the rubber as it enters.

At the end of the operation, the cylindrical product is cut in a transverse or radial direction in short lengths to obtain the individual belts.

The belts may have defects of different kinds which, also due to the lot system of production, would affect a high number of pieces of finished products. Moreover, the drawbacks due to such defects can appear after several months, say, when the belt is used on a motor vehicle.

It is thus extremely important that quality control of the belts, as well as verification of their actual characteristics, be made during their production, especially in view of the automation of the production processes.

The defects may be originated by many factors. For example, pressure conditions can influence the correct shape of the tooth's profile.

Other defects may derive from the temperature and/or the length of the curing cycle, for example, a crack in the surface can occur after too long a curing cycle.

Other defects may also derive from coiling. In fact, the length of the belt depends on the cords'winding tension, and a non-constant coiling tension can cause the production of belts having a length (distance between the axes) other than that desired.

Some of these defects can also be detected visually (more or less easily) on the sleeve, say, the formation of cracks or bubbles when the belts are at the extremities of the sleeve, while others (such as an out-of-spec distance between the axes due to a non-constant coiling tension) can be detected only after the individual belts have been cut and with suitable measuring and testing machinery.

Moreover, some defects due to production conditions can affect an entire lot of belts, such as, say, those due to incorrect curing conditions, while other defects affect only a certain number of belts in a limited area (for example, a temporary winding irregularity of the coiling machine); while still others can relate to an individual belt (for example, the junction of the cords following a breakage).

According to the known arts, product control was made visually, on a so-called "specula", with which it is possible to examine the sleeve on an illuminated area in order to visually identify any curing defects, say, air bubbles, irregular thicknesses, cracks, etc.

A further final check was also made, preferably by sampling, on the final product, that is, on the individual belts cut from the sleeve.

These production and checking techniques are afflicted by considerable drawbacks and limitations.

These techniques do not in the first place allow any action to be taken in real time when an anomaly is detected on the sleeve or, even worse, on the belt when it has already been cut.

At this point, in many cases, the anomaly is related to a substantial number of belts produced. For example, a defect thus observed in the coiling tension or pitch, shall be corrected only at a later stage and with much delay, that is, after many other belts with the same defect have been produced.

Similarly, an anomalous operation of the autoclave, such as, say, the presence of bubbles on the product due to the formation of condensate during curing, would probably affect the entire lot and, on occasion, even the subsequent lot which has been loaded into the defective autoclave.

In the second place, these prior techniques have the further drawback due to their uncertainty and to the difficulty in detecting all the defects, so that it results in a compromise, often unsatisfactory, between quality of the product and additional production costs due to rejects.

Lastly, with these methods positive indications for a corrective intervention are completely missing: even when the tests are made by suitable checking machinery, the lighting of an alarm pilot light or the signalling of a defect do not, on the whole, provide the operator with indications as to what action to take in the production process.

On the contrary, such an alarm can be an inducement to stop production without there being a real need to take such drastic and costly action in productivity terms.

SUMMARY OF THE INVENTION

The object of the invention is to overcome the above drawbacks and the limitations indicated for the prior art, achieving a process for the control and the production of continuous transmission belts, of an elastomeric material, produced on a forming sleeve in an installation with an automated production cycle, characterized in that it provides for the following stages:

a) measuring and storing a plurality of parameters related to the production cycle (process data);
b) periodically comparing each of these parameters with a first interval of values defined around the nominal value of such parameter, and emitting an enabling signal when the parameter falls within such first interval;
c) should one of said parameters fall outside said first interval, comparing such value with a second interval wider than the previous one and formed by an upper range and a lower range with respect to said first interval;
d) should said parameter be contained within said second interval for a time less than a corresponding pre-set duration associated with each of the parameters of the said plurality, producing a signal of conditioned acceptability suitable for activating one or more checks in at least one checking machine downstream from the installation or from part of it;
e) should said parameter fall outside said second interval, or inside said second interval for a period of time greater than a corresponding duration pre-set for that parameter, producing a rejection signal of the product influenced by that parameter.

The invention also relates to an installation for the automated production of belts wherein the production and the quality control are integrated with a high degree of synergy, to accomplish a highly reliable quality control, as well as an interaction with the production units, both by means of an effective feedback, and with a feedforward action on the process.

Thanks to the features of the invention it is possible to attain a control at the end of the product line in a position of satisfying the different and variable requirements, including those of quality, of the client or of the belts thus produced.

The installation for the automated manufacture of transmission belts, is characterized in that it comprises in combination:

a central control unit;

means for the preparation of a multi-belt sleeve comprising at least one coiling machine for the winding of inextensible threads on a toothed drum, and a calendering machine for the application of a non-cured elastomer composition, both equipped with a programmer of their own connected to the central control unit;

a molding and curing station comprising a plurality of autoclaves for the curing of said sleeves, there being associated with each autoclave a programmer connected to the central control unit;

a final station comprising at least one checking machine connected to the central control unit;

means for the handling of the drum along the length of the installation, operated by said central unit.

BRIEF DESCRIPTION OF THE DRAWINGS

The invention shall now be described with reference to some preferred, but non-limiting, embodiments illustrated by means of the enclosed drawings, wherein.

DETAILED DESCRIPTION OF A PREFERRED EMBODIMENT

The structure of the automated installation for the production of belts according to the invention will be illustrated first.

Figure 1:
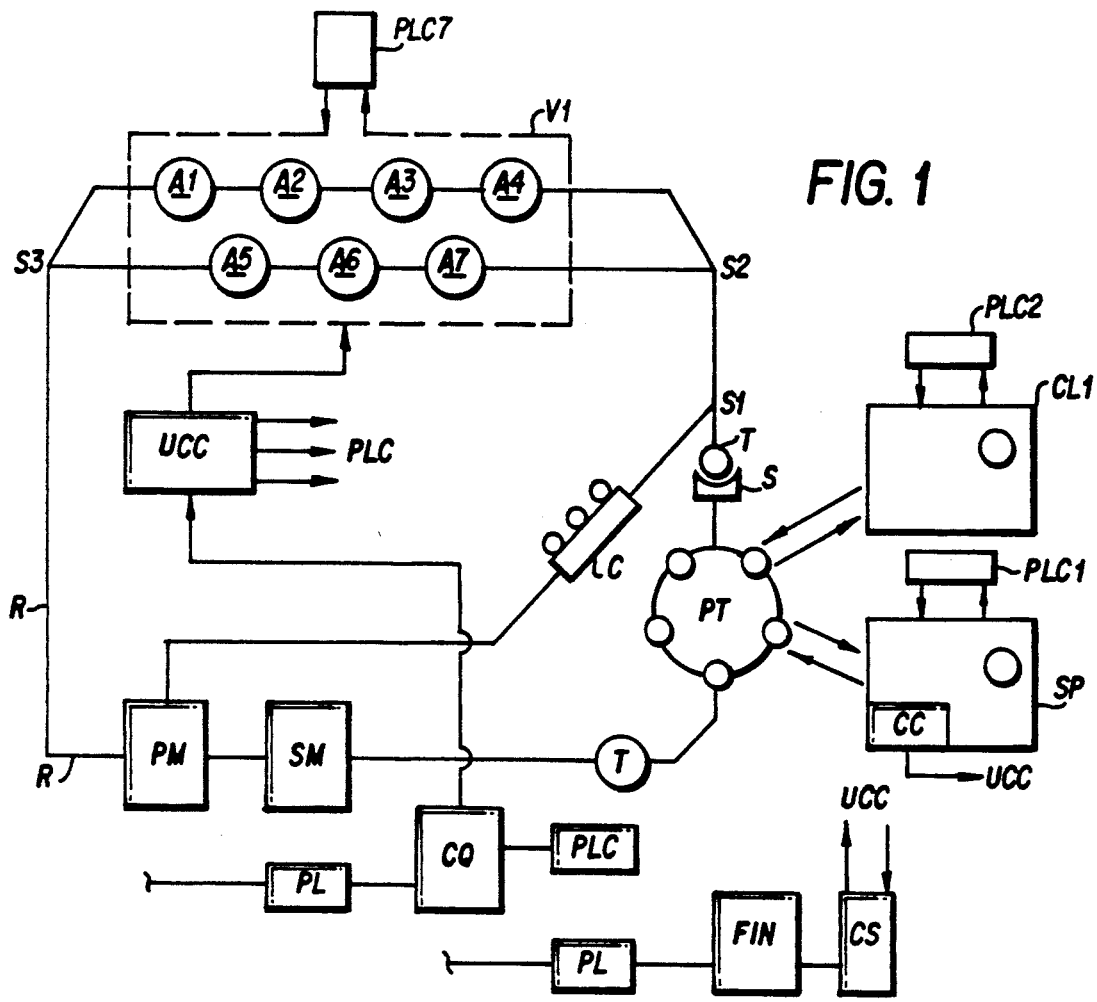
FIG. 1 schematically illustrates the construction of an automatic installation for the manufacture of belts according to the invention.

The installation illustrated schematically in FIG. 1 comprises a certain number of stations between which the semi-finished articles are moved to be subjected to the necessary processes.

As has already been indicated, the belts are produced in lots on drums and these are handled and moved by means of carts or pallets or similar means on rails or connecting tracks.

The drums T, equipped with the sheath of material, are fed to a rotating platform PT, which takes them in succession in a winding position wherein each drum is withdrawn by the coiling machine SP and wound with the threads which will form the belt's cords.

The coiling machine SP, in the same way as others of the installation, are controlled directly by a local control unit PLC1, accomplished, say, with a programmable logic programmer.

For an easier understanding of the operation of the installation, it is appropriate to illustrate in greater detail the general functions of such programmers.

The PLC associated with each machine checks and controls such machine thanks to instructions stored inside it in the form of data, which instructions according to one embodiment can, in whole or in part, be modified and/or updated during the operation of the installation by the central control unit UCC which shall be described later.

Typical data which are not normally changed are, for example, with a more particular reference to the coiling machine SP, the sequence of instructions which controls the start-up of the machine for feeding the thread, while the data related with the winding tension, the pitch, or the type of thread, if the machine has several automatically interchangeable coils, is changed during its operation for the production of belt lots having different characteristics.

Moreover, some operating data can be changed or corrected by the central control unit during operation, for example, the coiling tension, when an anomaly is detected in the downstream products, as shall be described in detail later.

With the coiling machine there is also associated an encoder CC or device in a position of univocally localizing the portion of drum on which the coiling machine is operating, that is, the belt that shall be subsequently cut from that portion. In this way it is possible to associate any anomalies of the coiling tension with a well-defined area of the sleeve (that is, the belts which shall be obtained from it). The construction of this device is of the known type and shall not be described in detail.

Lastly, each PLC transmits alarm signals to the central control unit corresponding to anomalies detected in the process run by it, for example, for the coiling machine a breakage in the thread.

The alarm signals have a hierarchical structure, suitably coded, in relation to the nature and the seriousness of the anomaly. For example, the coiling station is provided with at least one sensor monitoring the coiling tension with which the winding is actually accomplished. If this value departs from the nominal one stored in PLC1, the controller can act on the parameters which fall under its jurisdiction and, with a programmed sequence, act on one or more checking parameters to bring the coiling tension back to the nominal value, or at least inside a tolerance interval that is considered acceptable around such value.

At the same time, the controller shall send an alarm signal to the central control unit, that has a low level of priority, or it shall send no alarm signal at all, at least in this first stage of the anomaly.

If the attempt (or a pre-set number of attempts) to restore the nominal value meets with no success, or if the departure from the nominal value is greater than the threshold set for the intervention, the PLC will transmit to the central control unit UCC an alarm signal having a higher level, that is indicative of an anomaly of greater importance, the processing of which falls within the competence of the central control unit.

The case of a breakage of the thread shall have an even greater priority since such an anomaly should cause the stoppage of a part of the installation (coiling machine plus possibly the platform), and the request of action on the part of an operator to re-establish the thread's continuity. All these signals are defined as a whole as alarm signals or messages, whose importance is indicated by a code or priority.

In other words, and this also holds for all the programmable controllers of the installation which shall be indicated later, the PLC's are locally autonomous, in particular for routine operations, but are in any case subject to the central control unit which operates as a master, without, however, bearing the burden of the continuous and constant check of the individual machines.

Returning to the description of the installation's construction, the subsequent calendering station CL is arranged at a distance of one angular pitch with respect to the previous one, and here the drum is withdrawn and loaded onto a calendering machine which applies the necessary layers of non-cured rubber or composition, then taking the drum back onto the platform PT.

It is evident that the operation indicated is only indicative, and that the various feeds can also be run differently, for example, when the coiling and the calendering operations require substantially different times. Such operating methods are run directly by the central control unit UCC, or through a special PLC (not shown) associated with the mobile platform PT.

A programmable controller PLC2 is also associated with the calendering station, with control functions that are similar to those already illustrated for PLC1. In particular, for example, one datum that it can be necessary to change from time to time is constituted by the thickness of the applied composition (that is, the number of sheets if the thickness is constant), while one datum that can be updated as a result of anomalies or irregularities on the product can be constituted by the number of turns, or by the thickness of the calender. Since the deposited uncured rubber is sticky, there is applied over it a sheet of white paper which shall be eliminated at the end of the production stages. Such operation, which it is possible to execute in the calendering station or subsequently, is not illustrated as it is not important for the object of the present invention.

The drum T thus prepared, and hereinafter called a sleeve, is transferred on special supports S along the rail R towards the molding and curing station.

In a known way, the rail has branches and points, some of which are illustrated in FIG. 1. More accurately, the point S1 shown allows the reintroduction into the production process of the chambers in the case a molding and curing process is used with the chamber applied to the sleeve outside the autoclave.

As an alternative, if the installation uses autoclaves of the conventional type with an incorporated chamber, the point S1 is eliminated, together with the sleeve's assembly station, in any case not shown in FIG. 1.

According to a further embodiment, the point S1 can be used to reintroduce into the sleeve flow other sleeves already at least partly subjected to curing, which has been found insufficient by quality control, as shall be described later.

The molding and curing station V1 has seven autoclaves from A1 to A7, arranged along two rails which depart from a point S2. Of the seven autoclaves six are operational and one is in reserve and is used as a replacement of one of the autoclaves in use which may exhibit an irregular operation. The division must not be interpreted in a rigid sense, indeed, preferably, the role of the spare autoclave in the absence of anomalies is periodically permutated.

The curing operation shall be described later in a more detailed manner with reference to FIG. 4.

With the molding and curing station V1 there are associated seven programmable logic controllers, one for each autoclave, indicate PLC's, exchanges messages with the central control unit UCC.

Although they retain the same operating characteristics of the other PLC's, those of the curing station have a considerable number of data or parameters which are updated or changed in real time, in particular information on the curing cycle, that is, the set of data on times, pressures and temperatures which must be accomplished in the various autoclaves. This data can be changed (updated) in relation to the lot in production with certain dimensional and composition characteristics, or according to some embodiments, to correct anomalous situations which can occur in the curing cycle, as shall be described later.

In addition, the PLC's detect any operating anomalies of the autoclave and transmit the corresponding alarm signals to the central control unit, for example, magnitudes outside the tolerance, lack of electrical energy, and such like.

At the exit from the molding and curing station V1, the rails R or other equivalent handling means, are again connected together by means of the point S3, and the cured sleeves are taken to the operational station PM.

At such operating station the chamber is dismantled (if an extractable chamber is used) and sent back on a carriage C to the point S1.

The station also comprises a unit SM for the extraction of the belt sleeve from the drum, with the drum which continues along the rail R and returns to the coiling machine, after being covered with the sheath in material, not shown.

After the extraction from the drums, the sleeves are then transferred on pallets or other suitable handling elements PL which take them to several finishing stations or to only one subsequent finishing station FIN which executes operations such as grinding, heat marking and sleeve cutting to separate the belts from one another.

Preferably after the extraction of the drums, the sleeves are directed to a station comprising at least one checking machine CQ having the object of executing measurements and verifications on the individual sleeve and preferentially to communicate them to the central control unit SGO and for this purpose there is a PLC programmer.

Tests on the sleeve refer, for example, to the internal and external surface, the presence of bubbles, the regularity of the teeth's profile, etc. As shall be clarified later, these verifications and checks can be "customized" on the instructions of the central control unit to the associated PLC; the central control unit also provides the information suitable for the identification of the sleeve and/or the position on the sleeve on which to execute certain verifications.

In addition, it is possible to execute the checking procedure so that with each sleeve there is associated a magnetic support SOP on which the information related to that sleeve are written, that is, reference numbers, instructions for subsequent processes, any anomalies detected in the production process and particular checks to be executed on the final product, etc.

The function of these supports is that of allowing the continuation of the finishing and checking operations of the belts already produced in case of need, such as, for example, following a shut-down of the plant or if SGO is down.

Moreover, in this way the burden on the central control unit which supervises these processes only is lightened, since it is limited to checking the coincidence of the data on the magnetic supports with that in its memory.

As has already been said the checking process is actuated by having at least one checking station which could be arranged immediately after the curing and the extraction of the sleeves from the drums even before the subsequent finishing stages or at the end of all the finishing stages before the packaging stage of the belts.

According to a preferential solution it is possible to have both the mentioned checking stations, for example, one wherein the sleeve is checked and the final one wherein the individual belts in the same sleeve are checked, after they have been separated.

Preferably the belts are subjected to a final check in the CS station, for example, of the measurement of the belts'distance between the axes, of the height of the teeth, of the pitch, etc., with methods similar to those indicated earlier, that is, with the transmission of the results to the central control unit and the possibility on the part of the latter to request specific or more detailed checks on certain belts.

Later, for greater clarity and only as an example, a machine shall be described for the final checking of the belts.

Figure 3:
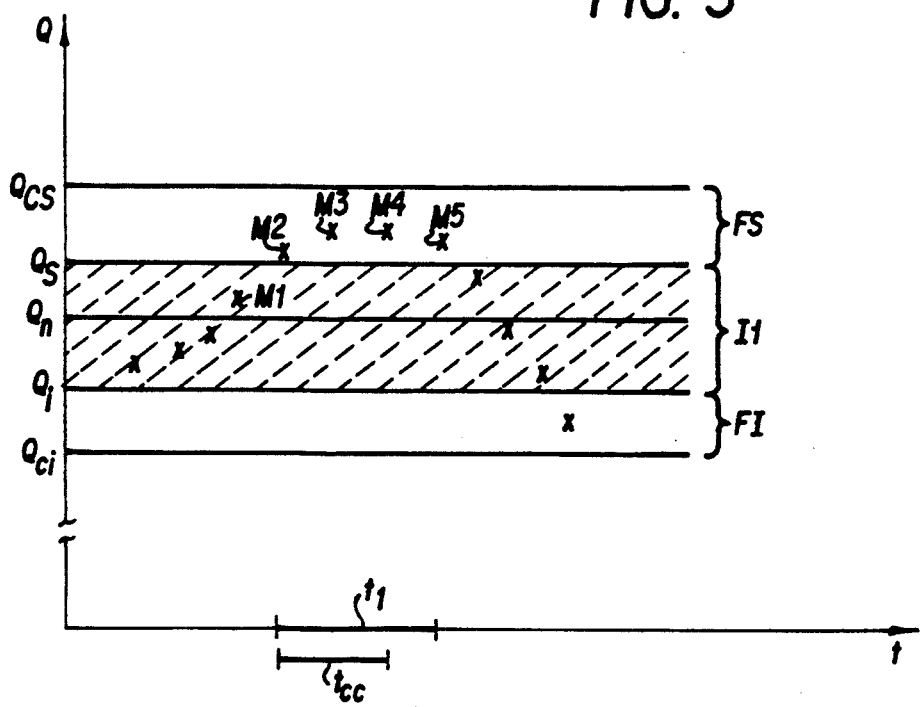
FIG. 3 is a diagram which illustrates the criteria of the checking procedure according to the invention;.

The checking method proposed according to the invention shall now be illustrated in general terms with reference to the diagram given in FIG. 3.

In such figure, the values Q of a process magnitude or parameter is given along the y-axis which typically, but with no limiting intent, could be the curing temperature, the pressure inside an autoclave, the coiling tension, etc.

The time t is given along the x-axis.

By means of suitable sensors, the magnitude is periodically recorded and examined.

The recording can also be made on a continuous basis on the part of the sensor and it can be examined by the central control unit UCC at pre-set time intervals, and in any case with a frequency that is sufficiently high in order to consider the recording as continuous to all practical purposes.

The recordings are indicated by little crosses in a time succession and marked by references M1–M5.

For the magnitude or parameter under examination there is a nominal value Qn, around which there is defined a first tolerance interval 11 within which the value of the magnitude Q is considered normal.

Such interval I1 is not necessarily symmetrical with respect to the value Qn and it has in fact been shown as defined by a lower threshold Qi and a threshold Qs that are not equidistant from Qn.

When the sensor records a value M1 within the interval I1, machine of the sensor shall transmit an enabling signal (alarm with a code that indicates the magnitude's normality), or it may even send no signal at all.

According to the invention, however, outside the acceptability interval I1 there is also defined a second interval formed by a higher band or range of values FS, limited at its upper end by a value Qcs, and a lower band or range of values FI, limited at its lower end by a value Qci.

As in the case above, here again symmetry with respect to the nominal value Qn or an equal amplitude of the bands FS and FI are not necessarily required.

When the value recorded for the magnitude is within this second interval, such as illustrated as an example for recording M2, the value of the magnitude is considered in a conditional way, that is the product obtained under such conditions is identified and marked as potentially acceptable.

The associated PLC will send to the UCC unit an alarm signal such as to generate a signal of conditioned acceptability of the corresponding product.

In other words, the limits Qi and Qs are usually selected in a very cautionary manner, so that the final product is nearly always acceptable even if the value of the magnitude is other than the nominal value, but such narrower interval involves substantial rejects.

The process according to the invention, instead of rejecting the product, and possibly stopping the installation or part of it when the magnitude goes outside such interval, proposes a closer more critical assessment to ascertain whether the product really is unacceptable, or whether it can still be recovered.

Different criteria of assessment are possible, also in relation to the type of magnitude or parameter under examination.

The simplest is that of identifying the part of production affected by the anomaly, "labelling" it so that it can be associated univocally with the anomaly, and checking downstream whether the quality of the product (semi-finished or finished) is acceptable or not.

For example, a duration of the curing temperature less than that provided for as a minimum, can still give as a result a sufficiently cured product, and the check (at the level of the sleeve) is in this case "customized" to verify whether that particular lot of belts (or the sleeve from which they are obtained) is sufficiently cured.

A more sophisticated criterion calls for monitoring the out-of-spec permanence in relation to another pre-set parameter (or of several pre-set parameters).

Typically such parameter can be time. In other words, as shown in FIG. 3, if the magnitude Q remains within the external interval (in the upper range FS in the case illustrated) for a time t1 greater than a pre-set time tcc, the product shall in any case be rejected, independently of, and without any, quality control.

But if, on the other hand, the magnitude falls within the tolerance interval FS for a time of less than tcc, the product would be subjected to specific more accurate checks, and possibly recovered.

An example will better clarify the above concepts.

Assuming that the magnitude Q is the curing temperature in an autoclave, its being higher for a time greater than that pre-set would lead to an overcured product to be rejected, while a permanence at such temperature for a time greater than that provided for, but for a limited duration, could still give an acceptable product, and this is ascertained by making further quality controls at the moment when that particular lot passes through the quality control machine.

It should also be observed that, if the tolerance anomaly is towards the low end, that is, if the temperature were in the lower range, the dependence from the time parameter need not necessarily be taken into consideration, and the process would anyway in this case provide for a corrective action consisting in subjecting the sleeve to additional curing so as to recover the product even if the quality control results were not to be positive.

The example clarifies the above indications with reference to the possible asymmetry of treatment and of processing. Moreover, the process according to the invention provides for the transmission of the information thus obtained to the central control unit UCC and its storage, so that this may eliminate the anomaly, or at least take the necessary n:easuree. For example, with reference to the case illustrated, the central control unit UCC could change the data of the PLC associated with the autoclave to return the duration of the cycle within acceptable values.

Two or more unsuccessful attempts in this sense will lead to the shut-down of the autoclave and to its replacement with the reserve one. The measures shall obviously be different if one autoclave is already down, and shall consists in "rejecting" a sleeve.

Another different result shall obtain when the magnitude affects another machine, say, the coiling machine: in case the coiling pitch is detected to be abnormal and it is not possible to return it within specifications in a certain number of attempts, the central control unit will request manual intervention and, if necessary, will bring the installation to a halt.

Figure 2:
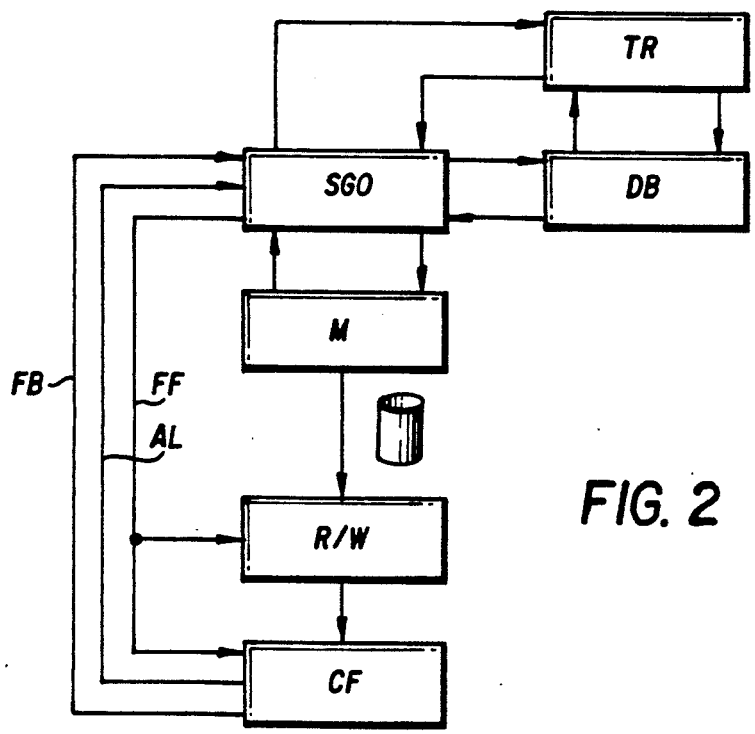
FIG. 2 is a block diagram of the control system used by the invention.

From what has been said above, it is clear that the checking process of the invention is based on the use of a narrow range of tolerance wherein the values of the magnitude (and thus the products which have been affected by it) are acceptable, and of a range of tolerance that is wider than the previous one, wherein the values of the magnitude are acceptable in a conditional manner. With reference to FIG. 2, there will now be briefly described the structure of the central control unit UCC of the installation illustrated in FIG. 1 and schematically indicated in FIG. 2 by "M".

It comprises a unit called SGO which receives from the installation M alarm signals, process data and data on the progress of the process states.

In turn, the unit SGO sends to the installation a substantial quantity of information and instructions, among them, in particular:

data referring to the process recipes;
data on particular operating cycles;
instructions for the installation set-up;
monitoring data;
process control data;
data on composition changes.

As has been indicated, all this data may be modified according to particular production requirements or situations.

The unit SGO is also connected to a relational database DB wherein information regarding the recipes usable in the plant and the alarm procedures are stored.

The units SGO and DB are also both connected to the TR unit which executes the off-line processing of the system as well as the trend processing, that is, it analyzes the installation's operating data so as to forecast the evolution of a given situation.

The installation M in turn controls the unit R/W reading and writing the magnetic supports SOP associated with the sleeves on the drums, which in turn is connected to the finishing control unit CF.

The latter is connected to SGO to receive the feed-forward control signals FF which are also sent to the reading and writing unit R/W, and to send the feedback signals FB, as well as the signals of alarm and the corresponding check results, AL In the representation of FIG. 2, for simplicity of representation, only one block CF is indicated schematically which can include a part related to the checks on the sleeve and a part related to the checks of the individual belts.

Figure 4:
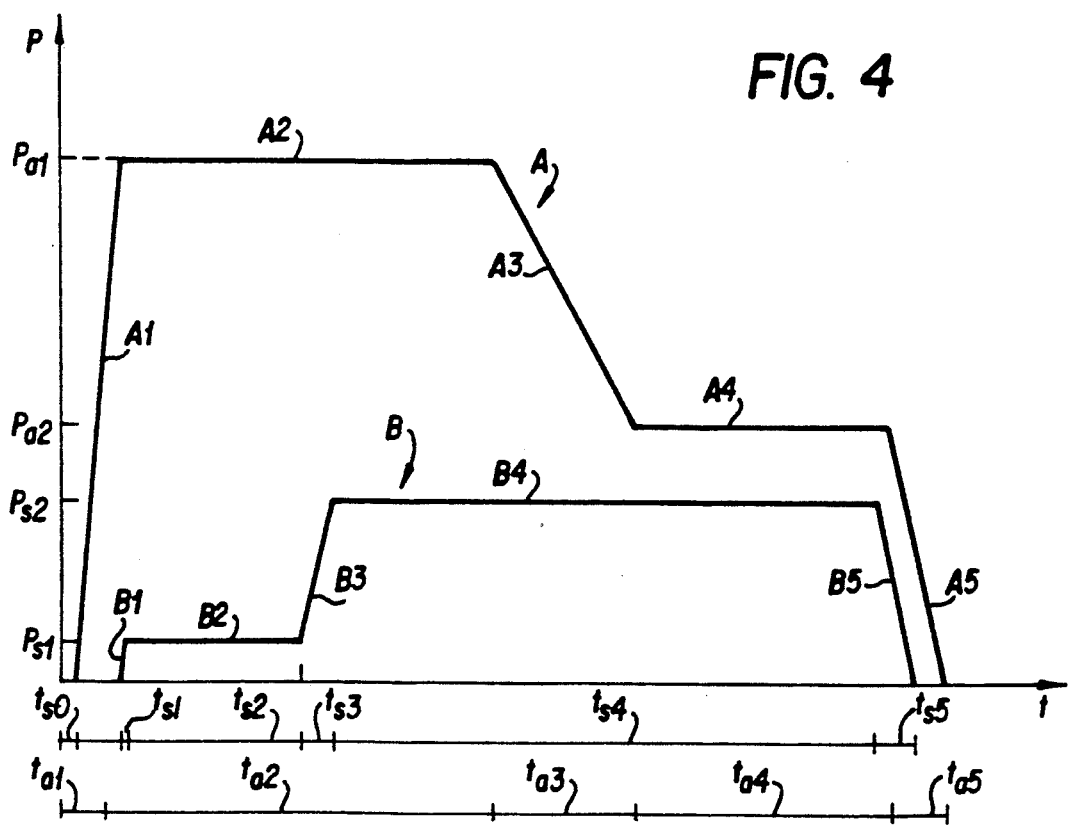
FIG. 4 is a diagram that illustrates the molding and curing cycle of the sleeves.

With reference to FIG. 4, there will now be illustrated as an example a curing cycle in an autoclave of the sleeve on which a chamber has been applied prior to the introduction into the autoclave. In the figure, time is given along the x-axis, while pressure and temperature are given along the y-axis.

Since there is in general a correspondence between temperature of steam and pressure, reference in the following description shall be made in turn to one or the other.

Two curves are represented in the figure, a curve A referring to the steam of the actual autoclave destined to press against the chamber round the sleeve, and a curve B referring, on the other hand, to the inside of the mould with the steam providing the curing heat, respectively.

The two curves can be considered as the visualization of a curing recipe associated with a given autoclave of the unit SGO in the form of instructions for the latter and suitable for accomplishing the indicated conditions.

The curve A or first scale, has an initial ramp A1 wherein the pressure acting on the sleeve goes, in a time ta1, from an initial value variable at the moment at which the autoclave is closed, to a nominal value of pressure Pa1 which is then kept constant (plateau A2) for a time ta2, at which the formation of the belts on the sleeve occurs, that is, their molding into the desired shape.

Subsequently pressure drops according to the descending ramp A3, also to reduce the supply of heat, attaining, within a time ta3, a value Pa2 which is kept constant for a time ta4 (plateau A4), to then drop back to the initial value in a time ta5 (ramp A5).

Simultaneously the cycle of the curing curve B also takes place, which starts with a certain safety delay after the autoclave pressure has attained the value Pa1. The pressure very quickly (time ts1, section B1) reaches a pressure Ps1 of the first scale at which curing begins, and keeps such value constant (plateau B2) for a time ts2, after which, along the ramp B3, the pressure attains the value of the second scale Ps2 (in a time ts3) and remains constant for the entire curing time (plateau B4), that is, for a time ts4, after which it again drops for the opening of the mould along the ramp B5 in a time ts5.

The actual molding stage occurs during the interval B2-B3, while the curing stage occurs substantially in the interval defined by B4.

Suitable sensors on the autoclave allow the verification of the cycle which is run by the autoclave's PLC, simultaneously transmitting the readings taken to the unit SGO, so that the latter can act in case of anomalies of various importance.

Figure 5:
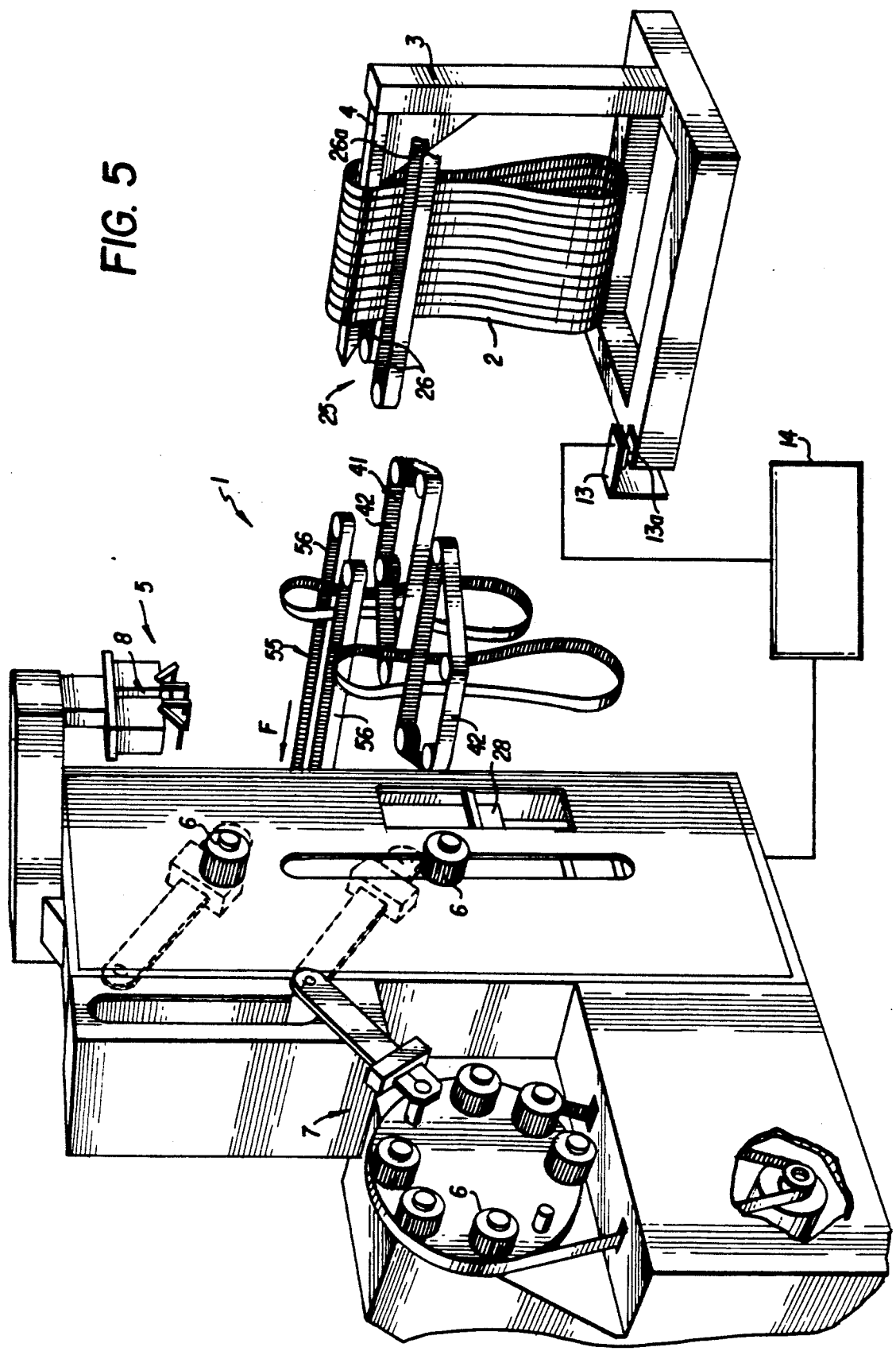
FIG. 5 shows a perspective view of an embodiment of a final checking station.

Now with reference to FIG. 5, a description is made of one of the many possible checking stations active at the end of all the finishing steps.

In this station, for example, the distance between the axes of the belts is checked.

A description is made of the main parts of the machine as it has already been described in detail in the two previously identified patent applications "Method of checking and automatic machine for executing verification tests on transmission belts" and "Process and machine for the automated transfer of transmission belts" and the disclosures of which are hereby incorporated by reference.

The machine 1 of FIG. 5 is ready to withdraw a plurality of belts 2 from a handling support 3 used for handling the belts themselves inside the plant wherein the machine 1 is installed.

To this end, the handling support 3 carries much like a cantilever a support bar 4 on which the belts 2, conventionally obtained by means of cutting operations executed on a single article in the form of a tubular sleeve, have been previously engaged so as to be suspended at their upper ends, as shown in the figure.

In the embodiment illustrated, at least one part of the belts 2 withdrawn by the handling support 4 is destined to be subjected to a quality verification test at a suitable operating station, indicated as a whole with 5 combined with the machine 1 under examination.

In this operating station 5 there is substantially provided for the presence of two pulleys 6 which can be positioned at a desired reciprocal distance and interchangeable, in relation to the type of belts 2 being processed, by the action of preparation means 7 having a completely automated operation.

The belts 2 which must be subjected to the qualitative verification test are engaged onto the pulleys 6 by means of a handling unit 8, also having automated operation, and, on the basis of the result of the test executed, are subsequently sent in the direction of the arrow F towards a packaging station not indicated as it is not important for the object of the invention, or they are rejected.

To advantage, as can be seen from the figure, with the handling support 3 there is associated a magnetic card 13a (or S O P card) whereon the data is stored as it relates, for example, to the dimensional characteristics of the belts 2 moved by the handling support itself, as well as any other data to indicate which of the belts 2 are to be subjected to the qualitative verification test.

This data is taken by a reading element 13 associated with the loading station at which the support 3 arrives, to be transmitted to an electronic control unit 14, which runs the entire functional operation of the machine 1, as well as of the operating station 5 and of the belt packaging one.

The electronic control unit 14 associated with a programmer, constitutes the local PLC which exchanges messages with the control unit UCC described above.

The messages for checking certain belts of the sleeve thus originate either from the unit UCC or from the card 13a.

The movement of the belts from the loading station to the testing one and from here to that of final packaging occurs with any handling means.

In the example described the machine has a first transfer unit, indicated as a whole with 25, having a pair of first driving elements 26, constituted, say, by toothed belts, arranged symmetrically along a common horizontal plane.

The first driving elements 26, have respective active sections 26a reciprocally opposed to one another and parallel to the longitudinal axis of the support bar 4.

Special fluid-dynamic actuators of transversal movement operate so as to displace the active sections of the transfer elements 26 in a direction perpendicular to the longitudinal axis of the support bar 4, from a rest condition wherein they are reciprocally at a distance from one another to allow the insertion of the belts 2 between them, when the handling support 3 is used in the loading station, to an operational condition wherein they are reciprocally closer to one another so as to operationally engage the belts themselves.

On the continuation of the first transfer unit 25 there is a second transfer unit, indicated as a whole with 41, having a second pair of transfer elements 42, arranged symmetrically along a common horizontal plane.

The second transfer unit 2 is ready to be displaced, for example, by a fluid-dynamic handling actuator, from a first position wherein it is substantially aligned on the continuation of the first transfer unit 25, to at least one second position wherein, as can be seen from the figure, it is displaced through some distance from the first transfer unit itself and parallel to it.

The movement of the second transfer unit 41 occurs along a horizontal direction perpendicular to the longitudinal axis of the active sections 26a of the first transfer elements 26.

In the operating position, the second transfer unit 41 is arranged in front of the operating station 5, so as to arrange one of the belts 2 to be withdrawn by the handling unit 8 and subjected to a qualitative verification test.

In a preferred embodiment, the machine 1 under consideration also comprises a third transfer unit 55 comprising third driving elements 56 of the type already described.

The operating cycle of the machine 1, according to the process under consideration, is as follows.

It is first of all provided for that the handling support 3 carrying the belts aligned along the support bar 4, is engaged in the loading station.

In this step, special actuators maintain the active sections of the first driving elements 26 reciprocally at a distance from one another, to allow the insertion of the belts 2 between them along a longitudinal direction.

When the handling support 3 runs up against a special abutment element, the reading element 13 identifies the data stored by the magnetic card 13a, and transmits it to the electronic control unit 14 which stores it for the appropriate operation of the machine 1, as well as of the operating stations 5, 5a.

In particular, in relation to the data recorded by reading the magnetic card 13a, the control unit 14, if necessary, provides for the substitution of the pulleys 6 on the testing station 5, by means of the alignment means 7.

Optionally, the data contained in the magnetic card 13a can also indicate to the control unit 14 which of the belts 2 have been pre-selected to be subjected to the qualitative test.

Through the actuators of transversal movement, the active sections belonging to the corresponding first driving elements 26 are brought reciprocally closer to one another.

The belts 2 are consequently subjected to the elastic deformation which determines the formation of the upper lobe 38 and of the lower lobe 39, as well as the simultaneous raising of the belts themselves by the bar 4.

The formation of the upper lobe allows the belt to be withdrawn with the handling unit 8.

The belts 2, held by means of the active sections of the driving element 26, are then displaced along the longitudinal axis of the support bar 4, in the direction of the second transfer unit 41, through the movement of the first driving elements themselves.

The pre-selected belt is moved by the second driving means of the handling station 8 which shall engage it operationally between the pulleys 6 to allow the execution of the qualitative verification test.

The method of execution of such test is here described briefly as it is discussed in detail in the previously specified patent applications.

A special positioning actuator arranges the pulleys 6 in the operational position.

There is then fed an operational fluid, such as air or oil under pressure, to the fluid-dynamic spring provided as a tensioning element, all so that the belt be subjected to a pre-determined tensioning.

The pulleys 6, as well as the belt over and between them are placed in rotation.

In this situation, any variations in the distance between the axes of the pulleys 6 are detected by a special optical line 28 consisting as is known of a photo-emitter and of a photo-receiver, one located on the part of the mobile pulley and the other on the fixed part of the structure.

On the basis of the data recorded in this operational stage, the electronic control unit 14 will establish whether any imperfections of the belt under test fall within the tolerance limits or whether, on the contrary, the belt is to be rejected.

After the test has been executed, the handling unit 8 will again withdraw the belt from the pulleys 6 to engage it again between the active sections of the second transfer elements 42, exactly in the same position which the belt itself had before its removal from the second transfer unit.

If the qualitative verification has given a negative result, the belt 2 is unloaded by the second transfer unit 41 through the movement of the second driving elements until the belt itself abandons the active sections at the second guide pulleys.

The belt unloaded in this way can be conveyed selectively to a collection hopper, or engaged by another transfer unit similar to the third transfer unit 55.

If the qualitative verification has, on the other hand, given a positive result, the belt 2 with the entire transfer unit 41 is displaced in alignment with the transfer means 56 which provides for its final positioning.

The foregoing description of a preferred embodiment is given by way of example and not of limitation, and variations thereof are contemplated to fall within the scope of the appended claims.

I claim:

1. A process for the control of the quality and of the production of endless transmission belts of elastomeric material, produced on a forming sleeve in an installation having an automated production cycle, comprising the following steps:

a) measuring and storing a plurality of parameters related to the production cycle;
b) periodically comparing each of said parameters with a first interval of values defined around a nominal value of such parameter, and emitting an enabling signal when the parameter falls within such first interval;
c) should one of said parameters fall outside said first interval, comparing such value with a second interval wider than the previous one and formed by an upper range and a lower range with respect to said first interval;
d) should said parameter be within said second interval for a time less than a corresponding pre-set duration associated with each of the parameters of the said plurality, producing a signal of conditioned acceptability suitable for activating one or more checks in at least one checking machine downstream from the installation or from part of said installation;
e) should said parameter fall outside said second interval, or inside said second interval for a period of time greater than a corresponding duration pre-set for that parameter, producing a rejection signal.

2. A process according to claim 1 wherein step d) includes a step of producing a further correction signal suitable for modifying an out-of-spec parameter.

3. A process according to claim 1 in which the stored values of the parameters are associated with the belts produced.

4. A process according to claim 1 in which one of said parameters is a temperature measured inside an autoclave.

5. A process according to claim 4 in which one of said parameters is a pressure measured inside an autoclave.

6. A process according to claim 4 in which one of said parameters is measured inside a sleeve.

7. A process according to claim 1 in which one of said parameters is a coiling tension on a sleeve.

* * * * *